United States Patent Office 3,303,498
Patented Feb. 7, 1967

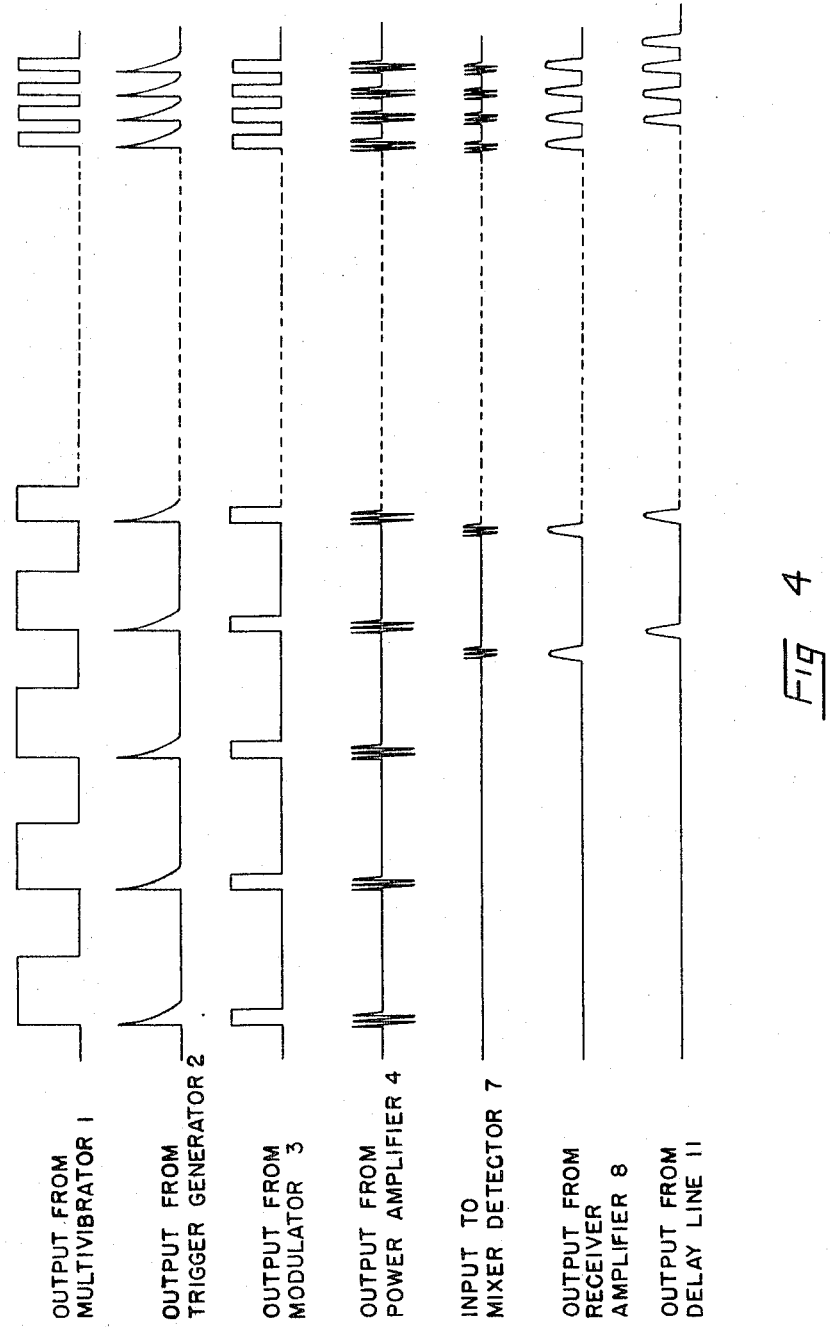

3,303,498
TARGET FEEDBACK RADAR SYSTEM
Wilfred H. Bacon, Scarboro, Ontario, Canada, assignor to Canadian Arsenals Limited, Ottawa, Ontario, Canada, a corporation of Canada
Filed Sept. 24, 1957, Ser. No. 685,994
4 Claims. (Cl. 343—7.5)

This invention refers to a system of measuring distance which is based on the fact that, due to its constant speed of propagation, a radio wave takes a finite time to travel from its source of emission to the object whose distance is to be determined and, upon reflection by this object to return back to its source; this finite time thus being a function of the distance of the object from the source of emission of the ratio waves. This is, of course, the basic principle of operation of all radar systems and many and varied are the applications to which it has been put.

The present invention is concerned with improvements in one such application and relates primarily to an improvement in the short range capability of a system which depends for its operation on the fact that if the reflected pulse, when received by the system is used to initiate the next pulse transmitted by the system, then, as the source of radio waves approaches the object whose distance is to be measured, the time for the radio wave to travel from the source to the object and back will decrease and the interval between pulses will therefore decrease also, that is to say, the pulse recurrence frequency or the number of pulses in any given period of time will increase. The pulse recurrence frequency or PRF, as it is known, is thus a function of the distance of the object and, by suitably extracting this frequency from the system, a direct reading may be obtained of the distance of the object from the source of radio waves.

Equipments operating in this manner are known and have been used, when drawbacks inherent in the system do not unduly restrict their use. The chief of these limitations is the fact that the system may concern itself with only one target at any given time, since to have a plurality of reflecting sources returning discrete echoes would cause the PRF to fluctuate in accordance with these returns and hence it would no longer be a function of distance. The most common application is that employing the system as an altimeter, since, by its very nature, an altimeter is concerned with returns from only one target, namely the ground though the system has been used in other applications by ensuring that only one return is obtained to each transmitted pulse.

Another limitation present in all systems to date has been the PRF at close ranges which approaches such prohibitively high levels (of the order of 20 to 30 megacycles) that it has not hitherto proved possible to meet in one system the dynamic range of frequency response necessary to cover the PRF's corresponding to distances ranging from distance of many miles down to very short ranges.

It is an object of this invention therefore to provide a variable PRF distance measuring system which is capable of use from an initial distance of many miles down to a distance of 20 or 30 feet.

With the realization of a short range capability for a variable PRF range measuring system it becomes possible to use this system for applications which require short range information and which require it, moreover, in a gated form, that is to say, the system must monitor the distance of an object and indicate when this object comes within a certain prescribed distance of the source, or in other words, passes through a gate. Among such applications is a fuse for exploding a guided missile when it comes within a certain distance of its target and also an aircraft collision warning system which indicates when other aircraft come within a certain distance of an aircraft carrying the system.

It is a further object of this invention, therefore, to provide a short range PRF distance measuring system which will automatically indicate when an object approaches within a prescribed distance from the source of radio frequency pulses.

In the fuse application mentioned above, it is highly desirable that anti-jamming features be incorporated in the system so that the missile is not exploded prematurely by jamming equipment within the target being attacked.

It is another object of this invention therefore to provide a fuse mechanism for use in guided missiles and the like which can be pre-set to explode at any given distance from its target and which includes features designed to reduce the possibility of premature detonation of the missile.

Further objects and embodiments of this invention will become apparent from the following description of the device including drawings in which:

FIG. 4 shows the idealized waveforms present throughout the system.

Throughout the following description, reference will be made to standard circuits which are familiar to those well versed in the art, and these will, therefore, be represented by block diagrams rather than any detailed circuitry.

Figure 1:
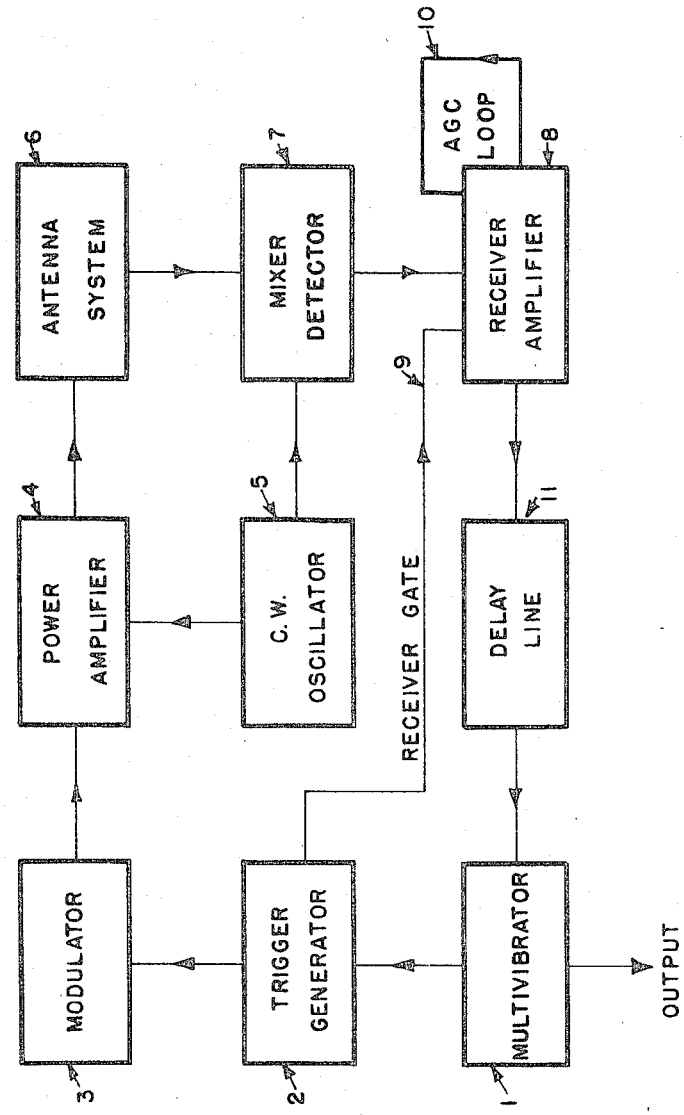
FIG. 1 is a block diagram of a variable PRF distance measuring system which incorporates an improved low range capability.

With reference to FIGS. 1 and 4, the multivibrator 1 is of the type which is normally free-running until it is synchronized by returned echo pulses emerging from the delay line 11. The free-running frequency of this multi-vibrator is such that it is lower than the PRF corresponding to the maximum detection range of the system. Thus, for an altimeter which was required to read up to heights of 60,000 feet, corresponding to a PRF of 7,000 pulses per second, the free-running frequency of the multi-vibrator 1 would be set below this frequency, at say 5 kilocycles. The multi-vibrator could be of any conventional type capable of synchronization but would preferably be of the plate-coupled variety which lends itself most readily to such synchronization.

The output from the multi-vibrator is fed to the trigger generator 2 where the square wave output of the multivibrator is differentiated and clipped, positive going pulses resulting from this operation being fed to a pulse generator which has as its output a pulse at the same PRF as the multi-vibrator which is of sufficient amplitude to trigger the modulator 3. The duration of this pulse is also critical since upon it depends the ultimate short range capability of the system, as it is essential that the transmitter have stopped emitting and the system recovered and ready to receive returned echoes by the time that the reflected wave reaches the antenna system. It will be obvious that this pulse duration will have to be very short for ranges of the order of 20 to 30 feet, and would be approximately 0.03 microsecond or less for these short distances. The differentiating circuit is of the usual type employing a capacitor and resistance giving a combined short time constant, and the pulse generator would be governed by the minimum range required of the system. Here it is common practice to employ a blocking oscillator when pulses of extremely short duration are required, or another suitable method of generating such a short pulse is to reflect a square wave down a short length of coaxial line which gives a pulse whose width is controlled by the time taken for the leading edge of the square wave to travel down the coaxial line and return to the starting end of the line.

The modulator 3 can be either of the hard or soft tube variety with in general, the hard tube variety being employed where the pulse is very short, and where pulse forming networks of the type usually employed with soft tube (thyratron) modulators are not available. The output of the modulator is thus a pulse normally of short duration and of sufficient amplitude to fire a transmitter power amplifier 4. The frequency of these pulses corresponding to the basic frequency of the multi-vibrator 1.

The power amplifier 4, in addition to receiving the pulses from the modulator 3 is also supplied with CW oscillations from the continuous wave oscillator 5. The power amplifier 4 is capable of amplifying these CW oscillations and sending them out through the antenna system 6 at an appreciable power level, but is normally restrained from doing so by a biasing voltage which holds the amplifier in a quiescent state except when pulses are received from the modulator 3. The effect of these pulses is to switch on the power amplifier 4 and to cause it to transmit a burst of CW oscillations equal in duration to the pulse received from the modulator 3. This pulse then proceeds to the antenna system 6 and is transmitted from the system towards the object whose distance is to be determined.

The basic RF frequency of the system is therefore governed by the CW oscillator 5. Since, in general, it is required that the component parts of the system be as compact as possible, and also that an appreciable number of RF cycles be obtained within a pulse of extremely short duration, these CW oscillation normally take place well up into the micro-wave frequency band and in the preferred embodiments are of the order of 10,000 megacycles. The usual source of frequencies of this order is a klystron, and the CW oscillator 5 is conveniently a frequency stable klystron which provides a frequency reference onto which the power amplifier 4, which is also a klystron, is locked. The RF energy emitted by the power amplifier 4 is therefore a pulse consisting of the number of cycles of RF oscillations appropriate to the width of the pulse received from the modulator 3, these cycles of RF energy being of the same frequency and in phase with the CW oscillations received by the power amplifier 4 from the CW oscillator 5.

These pulses of RF energy reach the antenna system 6 and are transmitted by this antenna system into space. The antenna system 6 takes the form most suitable for the requirements of the particular application and may comprise two separate antennas one each for transmitting and receiving, or many only have one antenna together with a duplexer. Due to the requirement that the system receive a return echo from only one target the antenna system, in general, is highly directional though, as will be seen later in the description of the preferred embodiments the individual beam patterns may vary considerably.

These transmitted pulses are exploratory and are emitted by the system at a PRF equal to the free running frequency of the multi-vibrator 1 until such time as an object comes within the detectable range of the receiver, when the pulses are reflected by this object back to the antenna. When these reflected pulses become sufficiently strong they are fed, as described below, through the receiving portion of the system to the multi-vibrator and synchronize it, so that it is no longer free running but is locked to these returned pulses.

The reflected pulses received by the antenna system 6 are directed to the mixer detector 7, which in the configuration shown, is connected to the CW oscillator 5. With this connection, the detector 7 becomes a synchronous mixer detector, the output from which is a series of video pulses of substantially the same duration and at the same PRF as those emitted by the transmitter of the system.

These video pulses from the mixer detector 7 are then amplified by the video amplifier 8 whose band pass is made sufficiently wide to cover that range of frequencies whose limits are, at the lower end, the PRF corresponding to the maximum initial detection range and at the upper end, the PRF corresponding to the minimum detection range which as will be seen later, has a terminal value. Alternatively where the frequency range to be covered is small, that is, of the order of 20 to 30 kilocycles, then the receiver amplifier could be made as a tuned amplifier with the appropriate band pass.

With this narrow band pass, the receiver amplifier cannot, of course, transmit all the harmonics necessary to preserve the square pulse shape which it receives from the mixer detector and accordingly the squared pulses entering the receiver degenerate into portions of an approximate sine wave of a frequency equal to the pulse recurrence frequency.

The use of a synchronous mixer detector followed by a narrow band pass receiver amplifier is preferred for the system because of its simplicity and small size, since it is not necessary to have a separate local oscillator, there is no intermediate frequency and hence no second detector is needed to obtain the video pulses, and the same order of performance is obtained with considerably fewer stages of amplification than would be necessary if an intermediate frequency amplifier was used. In addition, the noise figure capability of the synchronous detector is almost equal to that of a super-heterodyne receiver (in fact the synchronous detection receiver is a super-heterodyne receiver with zero frequency IF).

The basic requirement of the receiver section is that it produces pulses which, as will be seen later, need only be approximate sine waves of a frequency corresponding to the receiver PRF and it will be appreciated that this can be done by several methods other than the one described above each of which would function satisfactorily in the system and the preference indicated for synchronous detection is not to be construed as limiting the system to this type.

In certain embodiments, it is desirable to incorporate in the system an automatic gain control loop 10, as shown in FIG. 1. The function of this loop is to control the gain of the receiver amplifier in inverse proportion to the number of pulses received by the system. That is, the more pulses received, the lower the gain of the amplifier. The effect of this AGC loop is negligible at those frequencies within the band pass required to pass the range of PRF's used by the system and inside this band pass the gain is approximately constant. At appreciably higher frequencies, however, the effect of the AGC loop is to reduce the output of the amplifier to virtually zero. This, as will be seen later in the description of the preferred embodiments, is particularly useful in countering certain methods of jamming.

There is a receiver gate connection 9 from the trigger generator 2 to the receiver amplifier 8. The function of this gate is to disable the receiver whilst the transmitter is firing as otherwise the receiver could be damaged or paralysed by the transmitter pulse and in the latter case, with a slow recovery time, would not be receptive to reflected pulses from very close range targets.

The pulses leaving the receiver amplifier 8 are fed to the delay line 11 where they are delayed a finite period of time whose length is dictated, as will be seen later, by the requirements of the system. After thus being delayed, the pulses are applied to the multi-vibrator 1 causing the multi-vibrator to synchronize with these pulses and thus alter its free running frequency to a controlled frequency governed by the time taken for a pulse leaving the multi-vibrator to go via the transmitter and antenna to the object whose distance is to be measured and upon reflection back to the antenna system, through the receiver and the delay line to the multi-vibrator. Since, as was previously stated, the free running frequency of the multi-vibrator is deliberately made lower than the PRF corresponding to the maximum possible detection range of the system, it follows that the multi-vibrator frequency must increase.

Thus, as the distance between the antenna and the reflecting target decreases, so does the transit time for a pulse to go from, and be reflected back to, the system and hence the multi-vibrator frequency increases. The PRF is thus a measure of the distance of the target from the system.

Included in this transit time, however, is the fixed delay introduced by the delay line 11. If the delay introduced by the delay line 11 is relatively small, then at long ranges, the time taken for the pulse to go to and from the target will be considerably greater than this delay and hence the PRF is not primarily controlled by the delay line 11. However, when the range becomes short, the delay introduced by the delay line 11 becomes appreciable when compared with the round trip time from the system to the target and back and, in the extreme case, that is at essentially zero range, this round trip time is zero and the total delay between a pulse leaving the multi-vibrator and the corresponding synchronizing pulse reaching the multi-vibrator from the delay line is almost entirely due to the delay in the delay line 11. Thus, it will be seen that, as a target approaches the system, the frequency of the multi-vibrator will change from its low free-running frequency to a synchronized value which increases as the target approaches to a limit governed by the delay line 11. Thus, with the introduction of the delay line 11, there is reached at zero range a finite PRF controllable by the delay introduced by the delay line 11 as compared to the very high PRF which would be reached in the absence of this delay.

There is a desired range of values for the delay to be introduced by the delay line 11 and these are controlled on one hand by the fact that if the delay is made too short then the PRF will reach an undesirable high value, and on the other hand that if the delay is made too long then the time interval between successive pulses will become too great and the rate at which information is received on the target distance will become too low. It has been found in practice that a range of from 5 to 15 microseconds is most suitable for general applications, the exact value depending on the specific embodiment. Considering a value in the middle of this range, that is 10 microseconds, it will be appreciated that the PRF associated with this delay at zero range is approximately 100 kilocycles and since, as stated, the system will synchronize with pulses from the receiver amplifier 8 which are in essence portions of approximate sine waves of a frequency corresponding to the PRF, that is to say, no harmonics of this basic frequency need be considered, then the upper frequency limit required throughout the system is that corresponding to the PRF at zero range, namely 100 kilocycles. Thus, the upper limit of the band pass of receiver amplifier 8 need only be of the order of 100 kilocycles and similarly the delay line 11 need only have a band pass of 100 kilocycles.

In FIG. 4 the idealized waveforms are shown as after emitting several exploratory pulses, the system locks on to a reflected pulse, thus increasing the pulse recurrence frequency, which continues to increase as the distance of the system from the reflecting object decreases until, as is depicted in the train of pulses on the right of the diagram, this distance becomes almost nil, when the transmitted and received pulses are practically simultaneous, and the pulse recurrence frequency is controlled almost entirely by the delay introduced by the delay line 11.

From the above it will be appreciated that the system may thus be considered as a closed regenerative loop containing variable and fixed time delays, the variable delay being governed by the time taken for a transmitted pulse to reach a target and be reflected back to the system, and the fixed time delay being controlled by the delay line 11. The pulse repetition frequency of this loop therefore varies between two set limits in accordance with the distance of the reflecting object, the lower limit of PRF being governed by the free running frequency of the multi-vibrator 1 which is made lower than that corresponding to the maximum initial detection range of the system and an upper frequency limit controlled by the delay line 11. This varying pulse recurrence frequency may be most suitably extracted from the multi-vibrator 1 whose output, it will be noted, is a square wave of constant amplitude whose frequency corresponds to the PRF of the system since it controls the pulse recurrence frequency of the system.

Having thus disclosed the basic method of operation of the invention, it is now pertinent to consider some embodiments where this improved short range capability is of particular value.

Figure 2:
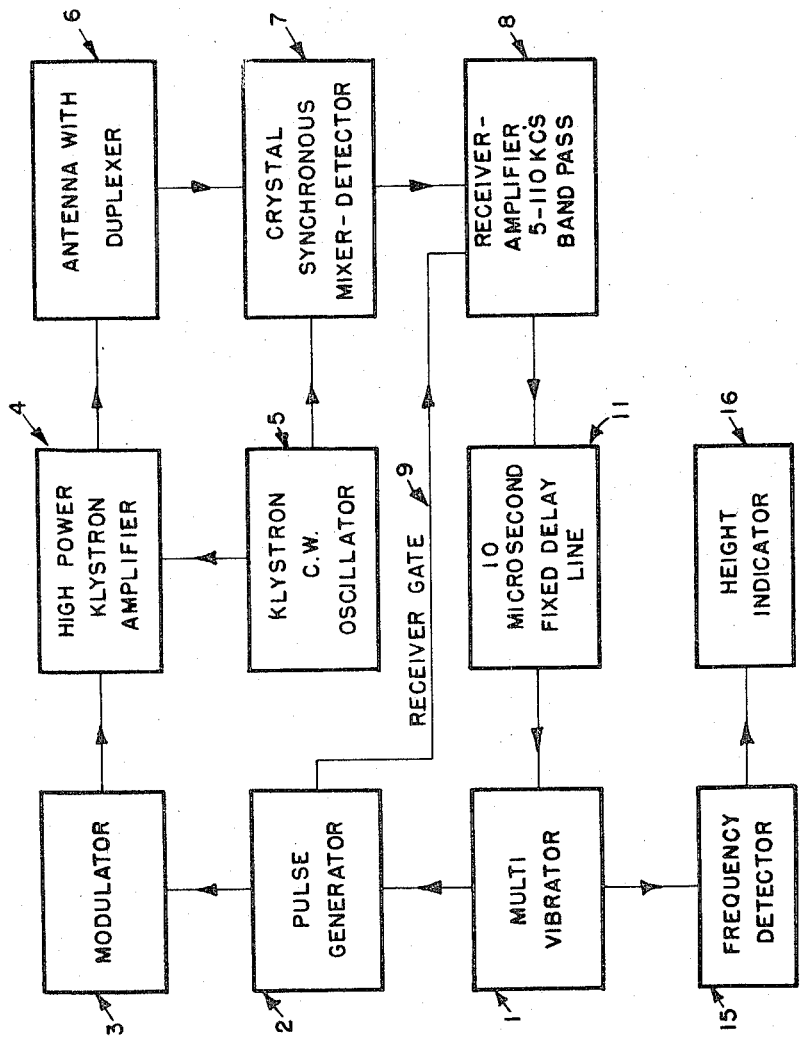
FIG. 2 shows this system when employed as an altimeter.

The first of these is as in FIGURE 2 in which the system is shown employed as an absolute height indicator, or altimeter, which is suitable for use from 25 feet to 60,000 feet.

Employing a 10 microsecond fixed delay line, the upper frequency limit of the system would thus be 100 kilocycles. The lower frequency limit can be set from a consideration of the round trip time for a pulse leaving an aircraft at a height of 60,000 feet, to come down to earth and then return to the aircraft. This is approximately 125 microseconds. With the 10 microsecond fixed delay and allowing for the recovery time of the system and the inherent delay in other component circuits, a minimum inter-pulse interval of 150 microseconds would be approximately correct. This corresponds to a frequency of 7 kilocycles and the minimum band pass required is thus from 7 to 100 kilocycles. As is normal, the band pass in practice would be a little wider and here would be set from 5 to 110 kilocycles.

Considering now the basic blocks of the system as described previously with the circuit parameters being known it is possible to be more specific about the construction of these blocks.

The multi-vibrator 1 would be a plate-coupled multi-vibrator whose free running frequency would be 5 kilocycles; the pulse generator 2 would be a blocking oscillator pulse generator whose output would be a pulse of 0.03 microsecond; the modulator 3 would be a hard tube modulator driving a high power klystron amplifier 4 operating in the 10,000 megacycle region and then the associated klystron CW oscillator 5 would therefore also be operated in the 10,000 megacycle region. The required pattern for the antenna system 6 for this application would be a solid, downward looking, cone which would be most suitably produced by a parabolic dish with a single feed connected to a duplexer; the synchronous mixer detector would be a germanium crystal diode and the receiver amplifier 8, since it has to cover an appreciable range of frequencies, would be a video amplifier covering from 5 to 110 kilocycles; the most suitable component for producing the 10 microsecond delay 11 is a quartz delay line whose band pass should also cover from 5 to 110 kilocycles.

The output from the system is taken from the plate of one of the multi-vibrator tubes and is fed to a frequency detector 15 which, in its simplest form, is a counter circuit having a D.C. output proportional to the number of pulses received by the counter circuit in a given period. This D.C. output is then fed to a meter suitably calibrated in height. This simple circuit is effective where the system does not have to register very slight changes in height and hence is used when the aircraft is flying at normal operating altitudes. However, where the system must indicate height changes of the order of 100 feet or less, such as when the aircraft is aproaching a runway for a landing, then the order of sensitivity obtained by a counter circuit is not sufficient and resort must be had to some other method. At these low altitudes, the frequency detector must be sensitive to very slight changes in the frequency of the multi-vibrator, since, for example, a height change of 50 feet only causes a 0.1 microsecond variation in the time taken for the pulse to go to and return from the ground and this 0.1 microsecond change must be measured relative to an inter-pulse interval of 10 microseconds (when the PRF is controlled almost wholly by the delay line), that is a sensitivity of the order of 1 in 100 is required. Sensitivities of this order can be obtained by using a frequency sensitive bridge circuit or by comparing the frequency to be measured with a standard reference frequency in this case of, say, 100 kilocycles. With these types of circuits, an output can be obtained which will vary appreciably with such slight changes in frequency and this varying output can be connected to a meter or other such device which will indicate the altitude of the aircraft. The complete altimeter system could therefore contain a counter circuit for the measurement of height at normal operating altitudes and a special circuit for measuring altitude at for example 500 feet or less.

In certain applications, the short range capability of this system is best utilized, not by having the range indicated directly on a meter as in the altimeter application, but by having the output connected to a gating mechanism which indicates when the distance reaches a set, pre-determined, value.

Figure 3:
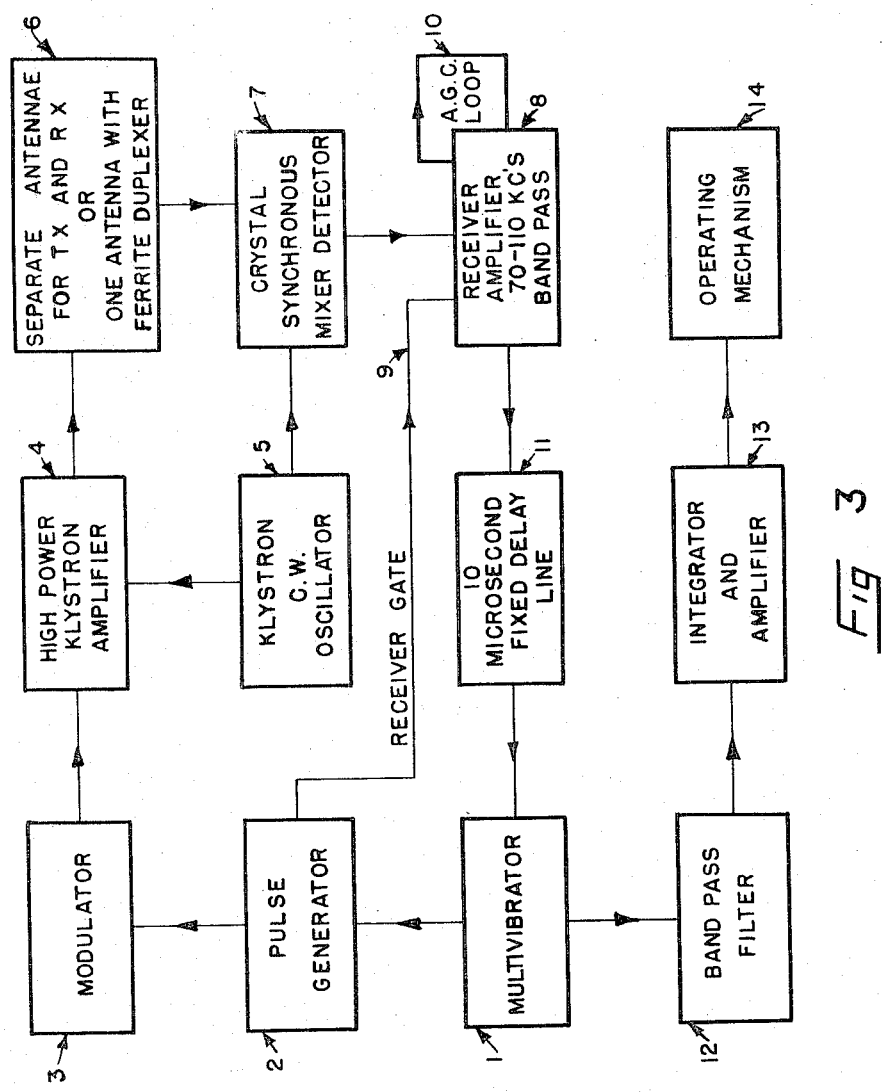
FIG. 3 shows this system incorporating a range gate and anti-jamming features.

Such an arrangement is illustrated in FIGURE 3. Here the blocks are described for FIGURE 2 except for the antenna system 6 and the band pass of the receiver amplifier 8 which, as stated above, depend on the particular embodiment being used.

Here the gating mechanism is a band pass filter 12 which is fed from the output of the multi-vibrator 1. This filter is so designed that pulse recurrence frequencies below a certain value, which corresponds to a specific pre-determined range, are blocked by the filter. However, once the pulse recurrence frequency reaches this pre-determined value, the filter permits the pulses from the multi-vibrator 1 to pass through to the integrator and amplifier 13 whose function it is to ensure that the increased PRF now being passed by the filter is the genuine one due to the reflecting object and not a spurious one caused either accidentally by some random malfunction of the system or deliberately, as in the case of jamming. This it does by integrating the pulses, whose integrated value must reach a certain level before the amplifier included in this block will permit the operating mechanism 14 to function.

One eminently suitable embodiment for this type of system is that of the variable time fuse. This is the type of fuse used in guided missiles and the like and its requirements are, that it can be set to explode the missile at a given preset distance from the target; that this distance be a function of the burst pattern of the missile, and that the system incorporate the maximum possible protection against jamming.

The general system requirements for such a fuse are similar to those for the short range altimeter described above and the circuit blocks would be of the same type and have the same values as those described above, though here, since space is, of necessity, at a premium, it could be desirable to increase the transmitter frequency to a higher level and thus benefit by the reduced size of the components.

Again, as in the altimeter embodiment, the free running frequency of the multi-vibrator, and the band pass of the receiver amplifier and the fixed delay line would be governed by the maximum detection range required. Considering a maximum detection range of 2,000 feet, it can be shown that the PRF at this range is approximately 70 kilocycles. The free running frequency of the multi-vibrator is set somewhat below this value, say 50 to 60 kilocycles and the receiver amplifier band pass of from 70 to 110 kilocycles, with the delay line band pass covering this range of frequencies.

The cut-off frequency of the band pass filter 12 is set to that frequency corresponding to the maximum range at which the missile is required to detonate, for example, a maximum range of 100 feet would mean a cut-off frequency of approximately 98 kilocycles. Due to the directivity of the antenna system and also the possibility that noise might obliterate the pulses due to the reflections from the target, it is possible that initial detection of the target and the consequent locking of the free running multi-vibrator could take place at distance less than this maximum detonation range and correspondingly, at frequencies higher than the lower cut-off frequency of the filter. The filter must therefore have a definite band pass so that, as the system synchronizes with reflecting pulses from a target at less than the maximum detonation range, the resultant higher PRF will still actuate the system. For the example given above, a band pass of from 98 to 100 kilocycles would be desirable.

The filter could be of any type giving the required performance, but it has been found that the magnetostriction and Q-multiplier types operate most effectively in this role.

Missiles vary considerably in their burst pattern and hence it is desirable that the bearing, as well as the range, of the target from the missile at the moment of explosion be given consideration, for, if only range were to be taken into account, the missile would explode at its preset distance from the target, whether the target was dead ahead or abreast of the missile and since, in general, missiles have a considerably reduced explosive force in their direct path as compared with that directed sideways from the missile, it is essential that the missile explode quite close to a target which lies dead in its path though it can explode some distance away from a target which it is going to pass on the beam. This correlation of the burst pattern and explosion distance is done by means of the directivity of the antenna system. By suitably positioning the antenna system, it is possible to produce a beam pattern which corresponds approximately to the burst pattern and this combined with a sensitivity control of the system will ensure that reflected pulses of an amplitude sufficient to synchronize the multi-vibrator are not received until the target is within the burst pattern. Hence, it is possible for the multi-vibrator to remain free running until the target is at a distance away from the missile which is appreciably less than the maximum range of the burst pattern and when the system does lock onto the reflected pulses, the PRF immediately rises to a value very much higher than that corresponding to this maximum explosion range. Thus, as was mentioned above, it is necessary to make the band pass filter of sufficient width to ensure that the pulses, at this frequency, are passed by the filter to the integrator and amplifier.

The system has an inherent anti-jamming facility in that any source of jamming must not only transmit on the correct frequency but also at the correct pulse recurrence frequency. These inherent qualities are enhanced by the inclusion of the AGC loop 10 which, in the presence of noise modulated jamming effectively shuts down the receiver amplifier 8 until such time as the genuine reflected pulses from the target become sufficiently dominant with respect to the jamming signal. As a further precaution against the possiblity that a jamming source is operating at the correct frequency and emitting pulses whose PRF is constantly varying, the integrator incorporated in block 13 is designed to ensure that the pulse recurrence frequency is maintained for a definite number of pulses, with in general, at least 5 and preferably 10 pulses being required before the amplifier in block 13 will respond and actuate the operating mechanism 14.

Another preferred embodiment in which the system is used to operate a warning mechanism when a reflecting object approaches within a certain specified distance from the system, is that of an airborne collision warning device. The system here is identical with that described for the fuse, the system free running at about 50 kilocycles and locking at a distance of about 2,000 feet, that is a PRF of 70 kilocycles. The band pass filter will, in general, be set to operate at a lower frequency than the fuse, that is a greater warning range with, for example, the cut-off frequency being set at 90 kilocycles when warning is required of objects at a distance of 500 feet or less from the aircraft. The integrator amplifier 13 and AGC loop 10 could be retained in this application to guard against false alarms brought about by spurious radiation or malfunctions of the system.

The operating mechanism 14 could, for such a collision warning system, consist of both visible and audible alarms.

Since some knowledge of the relative bearing, as well as the range, of the object threatening collision is necessary, the antenna system could be divided to cover the air space around the aircraft in sectors with particular emphasis on those zones in which the greatest danger of collision exists. Each of the sectors could then be coupled to a separate PRF generator which, upon reaching the critical pulse recurrence frequency, would indicate an object threatening collision in the sector associated with this generator.

The embodiments of the invention in which an exclusive property or privilege is claimed are defined as follows:

1. A radio system, wherein emitted radio frequency signals encountering an object are reflected to a receiver which comprises, a radio frequency transmitter, said transmitter comprising, a modulator for said transmitter, normally free-running means for generating pulses at a chosen recurrence frequency, said generating means being synchronizable to generate pulses at a synchronized recurrence frequency which is higher than said chosen recurrence frequency, means connecting said generating means to said modulator, a radio frequency receiver for radio signals at the frequency of said transmitter, said receiver providing an output corresponding to the envelope of received radio signals, a time delay device for the output from said receiver and means connecting the delay device to said synchronizable generating means, said transmitter emitting a radio frequency pulse in accordance with a first pulse from said generating means, said radio frequency pulse after reflection by said object being received by said receiver and producing an output, said output after a time delay causing said synchronizable generating means to generate a second pulse, said second pulse being generated at a time earlier than that determined by said generating means in its free-running state and defining the period of said synchronized recurrence frequency, means sensitive to the synchronized recurrence frequency for indicating the distance travelled by said radio frequency pulse from said transmitter and upon reflection to said receiver, and a bandpass filter for the frequency sensitive means for passing only a specific range of synchronized pulse recurrence frequencies to said sensitive means.

2. A system as defined in claim 1 wherein said delay device delays said output for a period of from 5 to 15 microseconds.

3. A system as defined in claim 1 comprising integrating means, said integrating means receiving pulses from said generating means and storing energy at each pulse and losing energy in the interval between said last mentioned pulses, said frequency sensitive means being actuated by said integrating means only after a chosen number of said last mentioned pulses have arrived in a predetermined time interval.

4. A system as defined in claim 3 wherein said chosen number of pulses is at least 5.

References Cited by the Examiner

UNITED STATES PATENTS

| | | | |
|---|---|---|---|
| 2,511,599 | 6/1950 | Rochester | 343—7.5 |
| 2,513,478 | 7/1950 | Gutton | 343—7.5 |
| 2,528,119 | 10/1950 | Crosby | 343—7.5 |
| 2,921,302 | 1/1960 | Cartwright | 343—7.5 |

FOREIGN PATENTS 744,535    2/1956    Great Britain.

CHESTER L. JUSTUS, *Primary Examiner.*

FREDERICK M. STRADER, *Examiner.*

R. A. KUYPERS, T. D. JENNINGS, D. MEXIC, T. H. TUBBESING, *Assistant Examiners.*